TAPE TRANSPORTS

Inventor
ADRION N. GULNICK
RICHARD K. VAN VECHTEN
By Percy P. Lantzy
Attorney

April 10, 1962 A. N. GULNICK ETAL 3,029,006

TAPE TRANSPORTS

Filed July 2, 1958 2 Sheets-Sheet 2

Inventor
ADRION N. GULNICK
RICHARD K. VAN VECHTEN
By [signature]
Attorney

United States Patent Office 3,029,006

Patented Apr. 10, 1962

3,029,006

TAPE TRANSPORTS

Adrion N. Gulnick, Palisades Park, and Richard K. Van Vechten, Clifton, N.J., assignors to International Telephone and Telegraph Corporation, Nutley, N.J., a corporation of Maryland Filed July 2, 1958, Ser. No. 746,580

4 Claims. (Cl. 226—50)

This invention relates to tape transports for a magnetic recording and reproducing device and more particularly to means for preventing entanglements of the tape in such devices.

In magnetic tape recording devices, the tape is often driven by means of pressure rollers and rotating capstans. When the tape is moved at high speed, there is a tendency of the tape to adhere to the capstan which may result in the tape being entangled by the driving means with serious damage to the tape and loss of valuable data. This difficulty is experienced particularly with high speed bidirectional tape transports used in data storing and handling equipment where the tape movement is rapidly accelerated and decelerated and reversed.

An object of this invention is to improve the tape transport equipment so that the tape can be manipulated rapidly and smoothly.

A feature of the invention resides in the provision of a grooved capstan meshed with a peeler plate which effectively prevents the tape from adhering to the capstan, regardless of the speed of tape movement or reversal thereof.

Another feature of the invention is the vertical guide channels which serve to limit tape overtravel and to prevent the formation of tape loops between the non-driving capstan and its associated guide post when the travel is stopped or reversed.

The above-mentioned and other features and objects of this invention will become more apparent by reference to the following description taken in conjunction with the accompanying drawings, in which.

Figure 1:
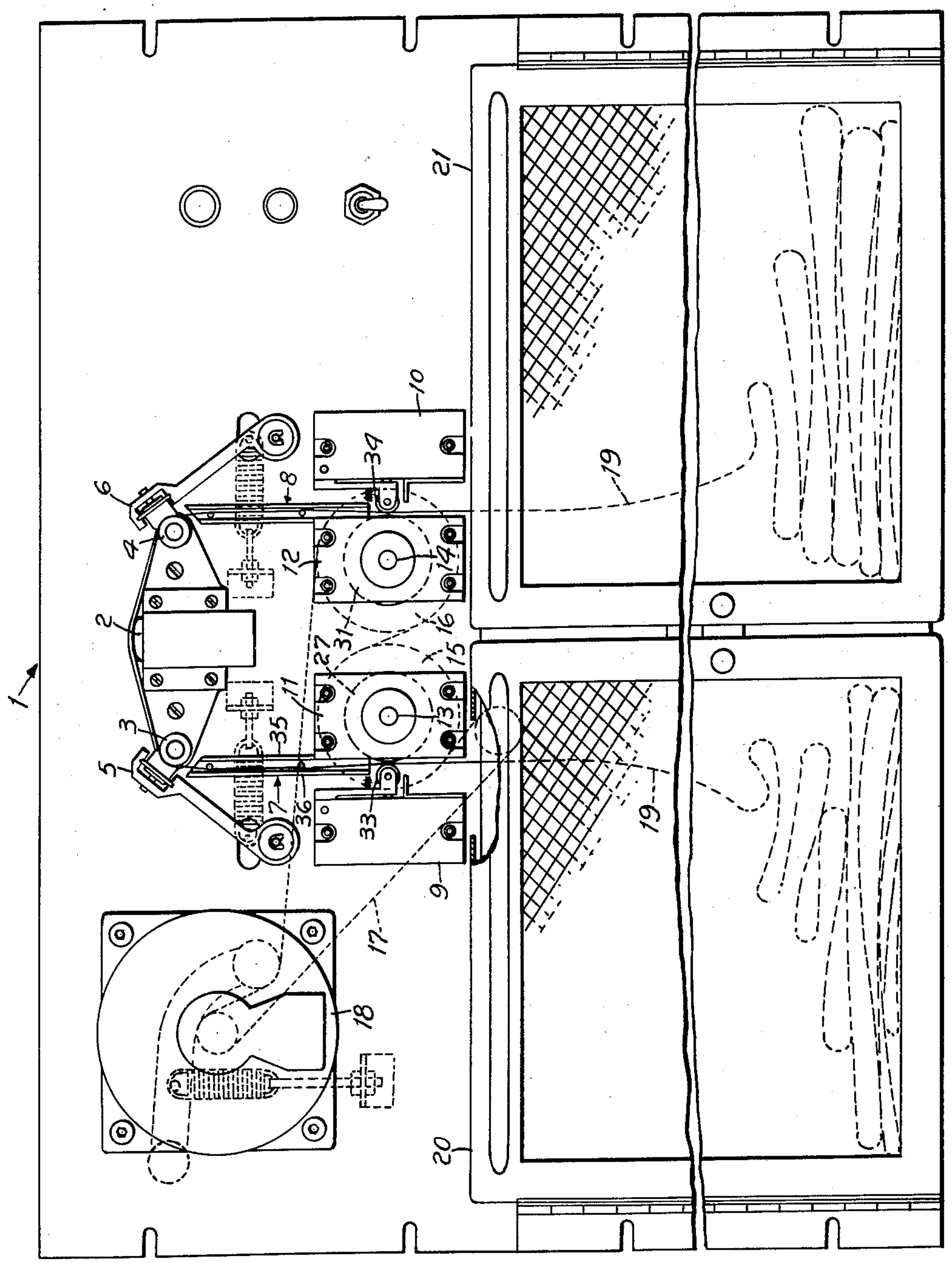
FIG. 1 is a front elevational view of a bidirectional tape transport constructed in accordance with this invention.

Referring to FIG. 1 of the drawings, illustrating the general arrangement of a tape transport mounted on a case plate 1 comprising assemblies symmetrically arranged about a recording-reproducing head 2 including guide posts 3 and 4, tension pads 5 and 6, guide channels 7 and 8, extending to the rollers of pressure roller assemblies 9 and 10, capstans 11, 12 mounted on shafts 13, 14 extending through panel 1 equipped with pulleys 15, 16 driven in opposite directions by belt 17 and motor 18. Magnetic tape 19 driven by capstans 11, 12 and pressure rollers 9, 10 is stored in loose folds in bins 20, 21.

Figure 2:
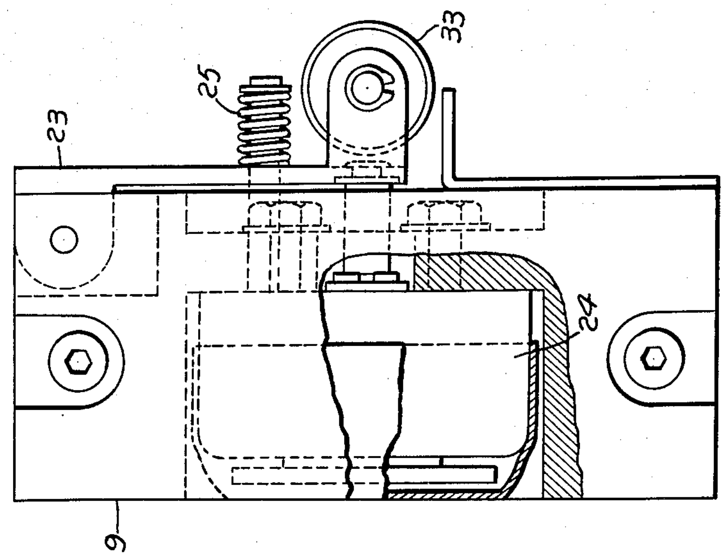
FIG. 2 is a side elevational view of a pressure roller with a portion of the casing broken away to show associated solenoid.

A pressure roller assembly 9 is shown in FIG. 2 comprising a roller 33, which may be of metal mounted on a hinged bracket 23 driven by solenoid 24. Spring 25 restores the roller to the non-operated condition.

Figure 3:
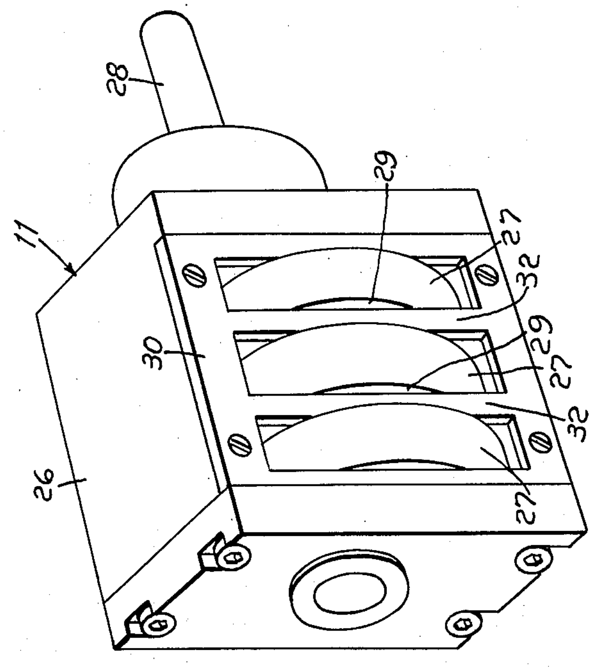
FIG. 3 is a perspective view of an assembly of grooved capstan and a meshed peeler plate.

Referring to FIG. 3, a capstan assembly 11 is shown comprising a housing 26, a capstan roller 27 of cylindrical form somewhat wider than the tape made of a resilient material such as rubber or rubber like plastic molded on a shaft 28 and provided with a plurality of annular grooves 29 meshed by the bars 32 of a peeler plate 30.

In operation, the magnetic tape 19 is moved from one to the other of bins 20, 21 depending upon the direction of movement. This movement is accomplished by pressing tape 19 against either of the continually rotating capstan rollers 27, 31 by energizing one of the solenoid driven pressure rollers 33, 34. The capstan rollers 27, 31 are driven by a belt 17 which passes over pulleys 15, 16. A synchronous motor 18 is used to drive the belt. When the left-hand pressure roller 33 is actuated, tape 19 is pressed against the corresponding capstan roller 27 which rotates counterclockwise causing the tape to be pulled across the magnetic head 2 out of the right-hand bin 21 and into the left-hand bin. The right-hand pressure roller 34 is de-energized for this direction of tape motion. To move the tape in the opposite direction, the right-hand pressure roller 34 is actuated while the left-hand pressure roller 33 remains de-energized.

Tape 19 is guided laterally by non-rotating guide posts 3, 4 directly adjacent to the magnetic head 2 and is held in contact with the guide posts by the spring loaded pressure pads 5, 6. The friction developed by the guide posts 3, 4 and pressure pads 5, 6 on the tape 19 provides the necessary tension in tape to keep it in intimate contact with the head 2. This same friction also serves to brake the tape 19 when both pressure rollers 33, 34 are disengaged from the capstans 31, 32.

The vertical guides 7, 8 serve to limit overtravel of tape 19 and to prevent the formation of tape loops between the non-driving capstan and its associated guide post when tape travel is stopped or reversed. As shown in FIG. 1, wall 35 of guide 7 is disposed in alignment with the peeler plate associated with capstan roller 27. The opposite wall 36 extends, shown closely to the pressure roller 33. As indicated the guides 7 and 8 are in the form of channel members.

The invention has been described in relation to a bidirectional tape drive. It is obvious, however, that the invention may be used for various driving devices including unidirectional tape drive. Furthermore, the two bins 20, 21 may be replaced by reels if desired, the reels being driven in cooperation with the operation of pressure rollers 33, 34.

While the principles of the invention have been described in connection with specific embodiments, and particular modifications thereof, it is to be clearly understood that this description is made only by way of example and not as a limitation of the scope of the invention.

We claim:

1. A bidirectional tape transport comprising a pair of bins to receive opposite end portions of the tape, a recording and reproducing head, guide posts for guiding said tape over said head for movement from one bin to the other, a first capstan roller disposed between one of said posts and one of said bins, a second capstan roller disposed between the other of said posts and the other of said bins, a pressure pad disposed in association with each of said posts to urge the tape against the associated posts and thereby maintain the tape under desired tension across said head, each of said capstan rollers having at least one groove circumferentially thereof, a pair of peeler plates having at least one bar, each of said peeler plates being disposed adjacent one of said capstan rollers with the bar thereof meshing in the groove of the roller, and first and second pressure rollers, respectively disposed adjacent said first and second capstan rollers to press the tape selectively against the associated capstan roller in overlying relation to said peeler plate to exert a driving movement to said tape in the desired direction.

2. In a bidirectional tape transport for moving magnetic tape rapidly along a predetermined path communicating with a recording and reproducing head, a tape driving unit comprising: a capstan roller having spaced grooves circumferentially thereof; a stationary housing for said capstan roller, said housing including a peeler plate having an opening therein through which the periphery of said capstan roller partially protrudes, said plate extending into said grooves adjacent said protruding periphery, said plate being shaped and positioned relative to said groove so as to remain spaced apart from said predetermined path; means for driving said capstan roller; a pressure roller; means coupled to said pressure roller for selectively actuating said pressure roller against said tape to press said tape against said capstan roller in overlying relation to said plate; and a channel member having a wall thereof in substantial alignment with said predetermined path in the vicinity of said peeler plate for preventing deviations of said tape from said predetermined path.

3. In a tape transport for rapidly delivering magnetic tape in a plurality of directions along a predetermined path communicating with a record and reproducing head, a tape drive unit comprising: a capstan roller having a peripheral area communicating with said path; means coupled to said capstan roller for driving said roller in one of said directions; a pressure roller; means coupled to said pressure roller for selectively actuating said pressure roller to press said magnetic tape into contact with said peripheral area of said capstan roller; and a stationary housing substantially enclosing said capstan roller, said housing having an opening therein through which said peripheral area of said roller protrudes, said housing being spaced apart from said predetermined path.

4. In a bidirectional tape transport for rapidly moving magnetic tape in either of two directions along a predetermined path communicating with recording and reproducing means, a tape driving unit comprising first and second capstan rollers communicating with said path, respective first and second stationary housings substantially enclosing said first and second capstan rollers, said housings being spaced apart from said path and having openings therein through which said respective capstan rollers protrude into communication with said path, means for rapidly driving said capstan rollers in opposite directions in relation to said path, respective first and second pressure rollers disposed opposite to and normally spaced apart from said first and second capstan rollers in relation to said path, and means for actuating a selected one of said pressure rollers against said opposing capstan roller to rapidly drive a tape disposed intermediate said actuated and opposing rollers in a direction along said path corresponding to that in which said opposing capstan roller is being driven, said spaced apart housings being so shaped and positioned in relation to said path as to offer no impedance to movements of said tape so long as the motion thereof is confined to said path, and to prevent entanglement of said tape in either of said rollers.

References Cited in the file of this patent

UNITED STATES PATENTS

| | | |
|---|---|---|
| 2,164,919 | Harmon | July 4, 1939 |
| 2,348,355 | Miller | May 9, 1944 |
| 2,551,198 | Barrett | May 1, 1951 |
| 2,614,374 | Hall | Oct. 21, 1952 |
| 2,726,286 | Pettus | Dec. 1, 1955 |
| 2,828,123 | Guillemette | Mar. 25, 1958 |
| 2,889,491 | MacDonald | June 2, 1959 |
| 2,913,192 | Mullin | Nov. 17, 1959 |